United States Patent
Lee

(10) Patent No.: US 10,547,876 B2
(45) Date of Patent: Jan. 28, 2020

(54) VIDEO CACHE RULE GENERATION SYSTEM AND METHOD

(71) Applicant: NANNING FUGUI PRECISION INDUSTRIAL CO., LTD., Nanning (CN)

(72) Inventor: Chi-Feng Lee, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 279 days.

(21) Appl. No.: 15/427,219

(22) Filed: Feb. 8, 2017

(65) Prior Publication Data

US 2018/0227608 A1    Aug. 9, 2018

(51) Int. Cl.
  *H04N 21/231* (2011.01)
  *H04L 29/08* (2006.01)

(52) U.S. Cl.
  CPC ....... *H04N 21/23106* (2013.01); *H04L 67/02* (2013.01); *H04L 67/2842* (2013.01)

(58) Field of Classification Search
  CPC .................. H04N 21/23106; H04L 67/02
  USPC ........................................................ 709/213
  See application file for complete search history.

(56) References Cited

U.S. PATENT DOCUMENTS

| | | | |
|---|---|---|---|
| 9,667,704 B1* | 5/2017 | Sonawane | H04L 67/10 |
| 2005/0172080 A1* | 8/2005 | Miyauchi | G06F 12/0813 |
| | | | 711/136 |
| 2014/0244727 A1* | 8/2014 | Kang | H04L 65/1069 |
| | | | 709/203 |
| 2015/0134913 A1* | 5/2015 | Huang | G06F 12/0833 |
| | | | 711/135 |

FOREIGN PATENT DOCUMENTS

| | | |
|---|---|---|
| CN | 102868909 A | 1/2013 |
| CN | 103583040 A | 2/2014 |
| CN | 104301743 A | 1/2015 |

OTHER PUBLICATIONS

MIT, Android Supported Media Formats, stuff.mit.edu, captured Jun. 2, 2014 (3 pages).*

* cited by examiner

*Primary Examiner* — Wing F Chan
*Assistant Examiner* — Leon Y Tseng
(74) *Attorney, Agent, or Firm* — ScienBiziP, P.C.

(57) ABSTRACT

A video cache rule generation system for generating cache rules for caching and playing back a video includes an obtaining module, a determining module, an extracting module, a comparing module, and a generating module. The obtaining module obtains URL addresses. The determining module determines whether each URL address belongs to a video URL address according to a media tag library. The extracting module divides a first URL address into chunks and extracts first key chunks from the chunks after division. The comparing module compares each first key chunk with a key chunk subclass, and marks a second key chunk where the second key chunk is found to be different from the key chunk subclass. The generating module generates a cache rule through generating a list of marked key parameter chunks. A video cache rule generation method is also provided.

13 Claims, 3 Drawing Sheets

VIDEO CACHE RULE GENERATION SYSTEM AND METHOD

FIELD

The subject matter herein generally relates to a system and method for generating video cache rules.

BACKGROUND

In a video website, multiple videos can be played online. When network speed is not fast enough or a network is unstable, a video is not played smoothly.

BRIEF DESCRIPTION OF THE DRAWINGS

Implementations of the present technology will now be described, by way of example only, with reference to the attached figures.

DETAILED DESCRIPTION

Figure 1:
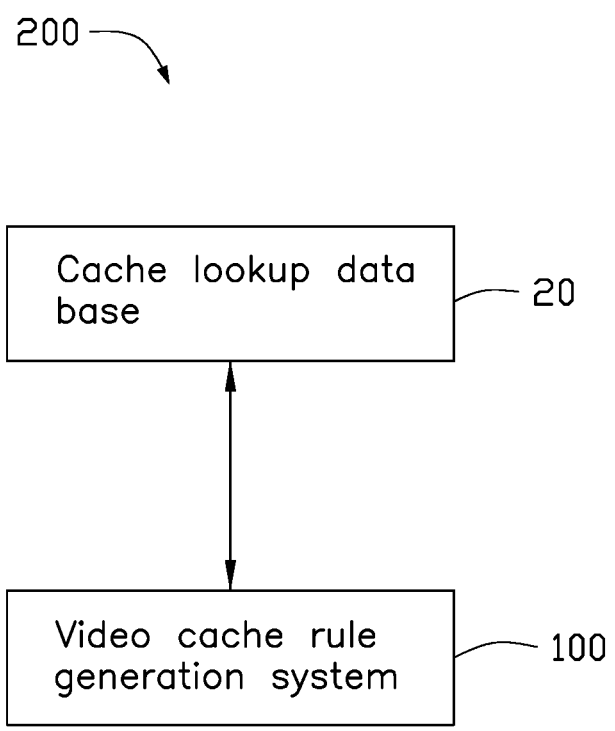
FIG. 1 is a diagram of an exemplary embodiment of a video cache rule generation system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
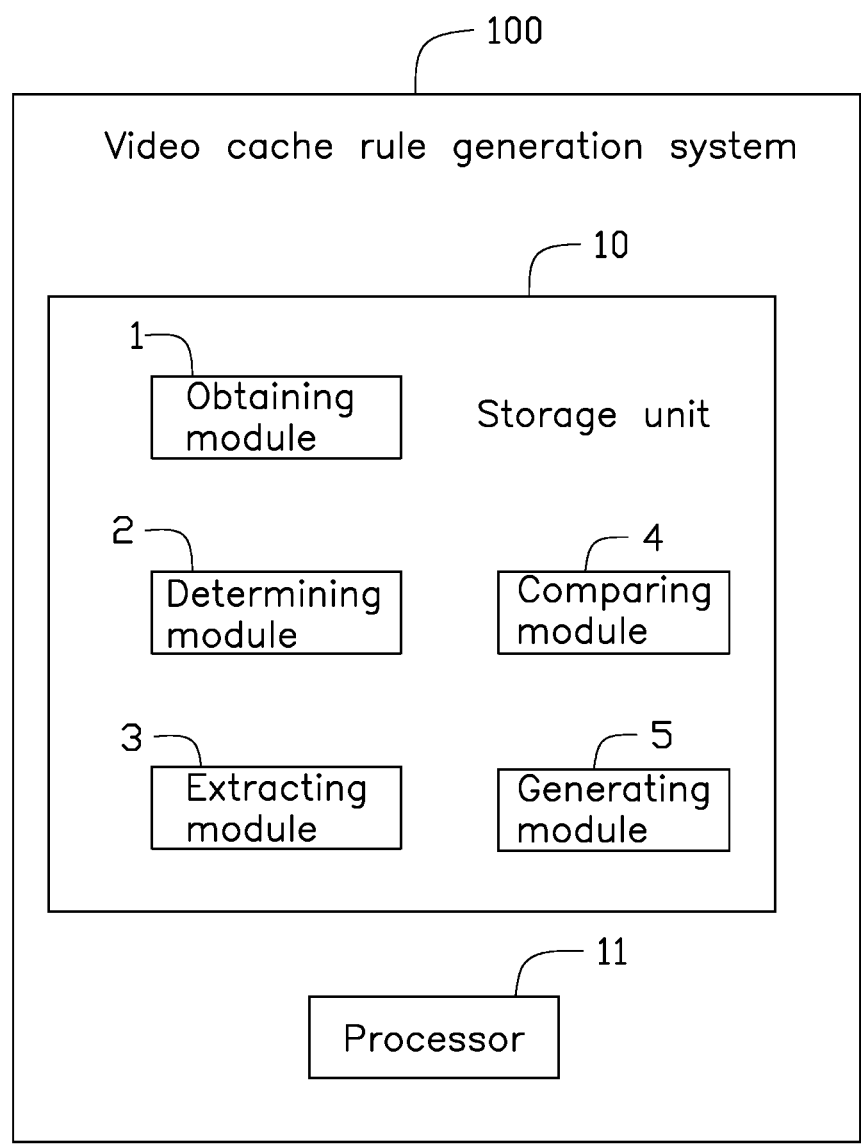
FIG. 2 is a block diagram of an exemplary embodiment of the video cache rule generation system of FIG. 1.

FIG. 1-FIG. 2 illustrate a video cache rule generation system 100 in accordance with an exemplary embodiment.

Referring to FIG. 2, the video cache rule generation system 100 can comprise at least one storage unit 10 and at least one processor 11. The video cache rule generation system 100 can further include a plurality of modules, such as an obtaining module 1, a determining module 2, an extracting module 3, a comparing module 4, and a generating module 5. The modules 1-5 can include one or more software programs in the form of computerized codes stored in the storage unit 10. The computerized codes can include instructions that can be executed by the processor 11 to provide functions for the modules 1-5.

The obtaining module 1 is configured to obtain a plurality of uniform resource locator (URL) addresses. The determining module 2 is configured to determine whether each of the URL addresses belongs to a video URL address according to a media tag library. Then, the determining module 2 can remove or delete non-video URL addresses from the URL addresses obtained by the obtaining module 1.

In one exemplary embodiment, the video cache rule generation system 100 can be operated in a video cache system 200 as shown in FIG. 1. The video cache system 200 is configured to cache videos. The video cache rule generation system 100 can communicate with a cache lookup data base 20 of the video cache system 200.

In one exemplary embodiment, the media tag library comprises a plurality of media tag keywords. The media tag keywords can be suffixes or file types of videos. For example, the media tag keywords can be fly, mp4, avi, rm, rmvb, wmv, ism, audio, video, 3gp, or mpg. Referring to FIG. 2, when a first URL address obtained by the obtaining module 1 comprises at least one media tag keyword, the determining module 2 determines the first URL address as belonging to the video URL address.

The extracting module 3 is configured to divide a URL address into a plurality of chunks of media file (parameter chunks) in response to the URL address being found to belong to the video URL address, and extract first key parameter chunks from the parameter chunks of the URL address. For example, the first URL address comprises a media tag keyword avi for example, the extracting module 3 divides the first URL address into a plurality of parameter chunks and extracts first key parameter chunks from the parameter chunks.

In one exemplary embodiment, the extracting module 3 divides the first URL address into a plurality of parameter chunks and applies a unique attribute to each of the parameter chunks. Then, the extracting module 3 can identify each of the parameter chunks according to the attributes. The extracting module 3 extracts the first key parameter chunks from the parameter chunks according to predetermined key parameter chunk attributes.

For example, the extracting module 3 divides the first URL address into a protocol parameter chunk, a host parameter chunk, a port parameter chunk, a path parameter chunk, a characteristic parameter chunk, a search parameter chunk, and a fragment parameter chunk. The predetermined key parameter chunk attributes comprise a host attribute, a port attribute, a path attribute, and a characteristic attribute. Then, the extracting module 3 extracts the host parameter chunk, the port parameter chunk, the path parameter chunk, and the characteristic parameter chunk as the first key parameter chunks.

The comparing module 4 is configured to compare each of the first key parameter chunks with a key parameter chunk subclass, and mark a second key parameter chunk of the first key parameter chunks in response to the second key parameter chunk being different from the key parameter chunk subclass.

In one exemplary embodiment, each of the first key parameter chunks is mapped to a different key parameter chunk subclass. For example, the host parameter chunk of the first URL address is mapped to a first key parameter chunk subclass. The first key parameter chunk subclass comprises a plurality of host parameter chunks extracted from other video URL addresses.

The generating module 5 is configured to generate a cache rule through generating a list of the marked key parameter chunks to summarize regularities.

In one exemplary embodiment, the comparing module 4 compares the host parameter chunk of the first URL address with host parameter chunks of the other video URL addresses. When the host parameter chunk of the first URL address is different from the host parameter chunks of the other video URL addresses, the comparing module 4 marks the host parameter chunk of the first URL address. The comparing module 4 compares the path parameter chunk of the first URL address with path parameter chunks of the other video URL addresses. When the path parameter chunk of the first URL address is different from the path parameter chunks of the other video URL addresses, the comparing module 4 marks the path parameter chunk of the first URL address.

When a media player plays a video online, the video is divided into hundreds of video fragments to be transmitted. Each of the video fragments may correspond to a cache rule. Where a video comprises hundreds of cache rules, a cache speed of the video is reduced. The video cache rule generation system 100 of this disclosure can convert the hundreds of cache rules into a smaller number of cache rules and this improves the cache speed of the video.

For example, the first key parameter chunks comprise the host parameter chunk, the port parameter chunk, the path parameter chunk, and the characteristic parameter chunk. When a video B is played online from a video website A1, the obtaining module 1 obtains a plurality of URL addresses relative to the video B that have the same host parameter chunk and the same path parameter chunk. The comparing module 4 compares the port parameter chunk and characteristic parameter chunk with corresponding key parameter chunk subclasses, and marks the port parameter chunk or the characteristic parameter chunk where the port parameter chunk or the characteristic parameter chunk is found to be different from the corresponding key parameter chunk subclass. The generating module 5 generates and updates a cache rule for caching the video B of the video website A1 through generating the list of the marked parameter chunks.

In one exemplary embodiment, a learning manner of the generating module 5 can be recording and classifying the marked parameter chunks to summarize regularities. When the marked parameter chunks contains the same parts portions, the generating module 5 records the same parts portions by creating a list. For example, the obtaining module 1 obtains a first URL address, a second URL, a third URL address, and a fourth URL address of the video B, and the first URL address, the second URL, the third URL address, and the fourth URL address belong to the video URL address. A characteristic parameter chunk of the first URL address is 123AX, a characteristic parameter chunk of the second URL address is 123BY, a characteristic parameter chunk of the third URL address is 123CZ, and a characteristic parameter chunk of the fourth URL address is 123CQ. The characteristic parameter chunks of the first to fourth URL addresses have the same digit set (that is, 123). The generating module 5 can record the same digit set as a rule and define the different part as a random number. Then, the generating module 5 can further determine that the characteristic parameter chunks of the video B comprise the digit set 123. The video cache rule generation system 100 can identify video fragments of the video B through determining whether a characteristic parameter chunk of a URL address comprises the digit set 123.

In one exemplary embodiment, when a video B, a video C, and a video D are played online from a video website A1, the video B, the video C, and the video D are stored in different files in the video website A1. The obtaining module 1 obtains a plurality of URL addresses relative to the video B, the video C, and the video D that have the same host parameter chunk (video website A1) but different path parameter chunks (videos B to D). The comparing module 4 further calculates a number of types of the second key parameter chunk. The determining module 2 further determines whether the number of types is greater than a threshold value. When the number of types is less than the threshold value and the second key parameter chunk is different from the key parameter chunk subclass, the comparing module 4 marks the second key parameter chunk. When the number of types is greater than the threshold value, the determining module 2 determines the second key parameter chunk to show no regularity. Then, the comparing module 4 does not mark the second key parameter chunk.

In one exemplary embodiment, the number of the URL addresses obtained by the obtaining module 1 is greater than the threshold value. For example, the number of the URL addresses is one hundred and the threshold value is less than ten.

For example, a video B, a video C, and a video D are played online from a video website A1. The obtaining module 1 obtains five hundred URL addresses (the five hundred URL addresses are video URL addresses), and the threshold value is twenty. When the comparing module 4 calculates a number of types of path parameter chunks of the five hundred URL addresses as being ten (less than the threshold value), the comparing module 4 marks ten different path parameter chunks of the five hundred URL addresses to summarize regularities. When the comparing module 4 calculates a number of types of path parameter chunks of the five hundred URL addresses as being one hundred (greater than the threshold value), the determining module 2 determines that the path parameter chunks of the five hundred URL addresses show no regularity. Then, the comparing module 4 marks none of the path parameter chunks of the five hundred URL addresses.

A video B may be played online from a video website A1, a video website A2, and a video website A3. The generating module 5 further combines marked key parameter chunks of each of the video websites A1 to A3 and generates the cache rule relative to the video B through generating the list of combined key parameter chunks to summarize regularities.

When a video B is played online from a video website A1, a video C may be played online from a video website A2, and a video D may be played online from a video website A3. The generating module 5 further combines marked key parameter chunks of each of the video websites A1 to A3.

In one exemplary embodiment, the generating module 5 combines the marked key parameter chunks of each of the video websites A1 to A3 through an "OR" operation algorithm.

Figure 3:
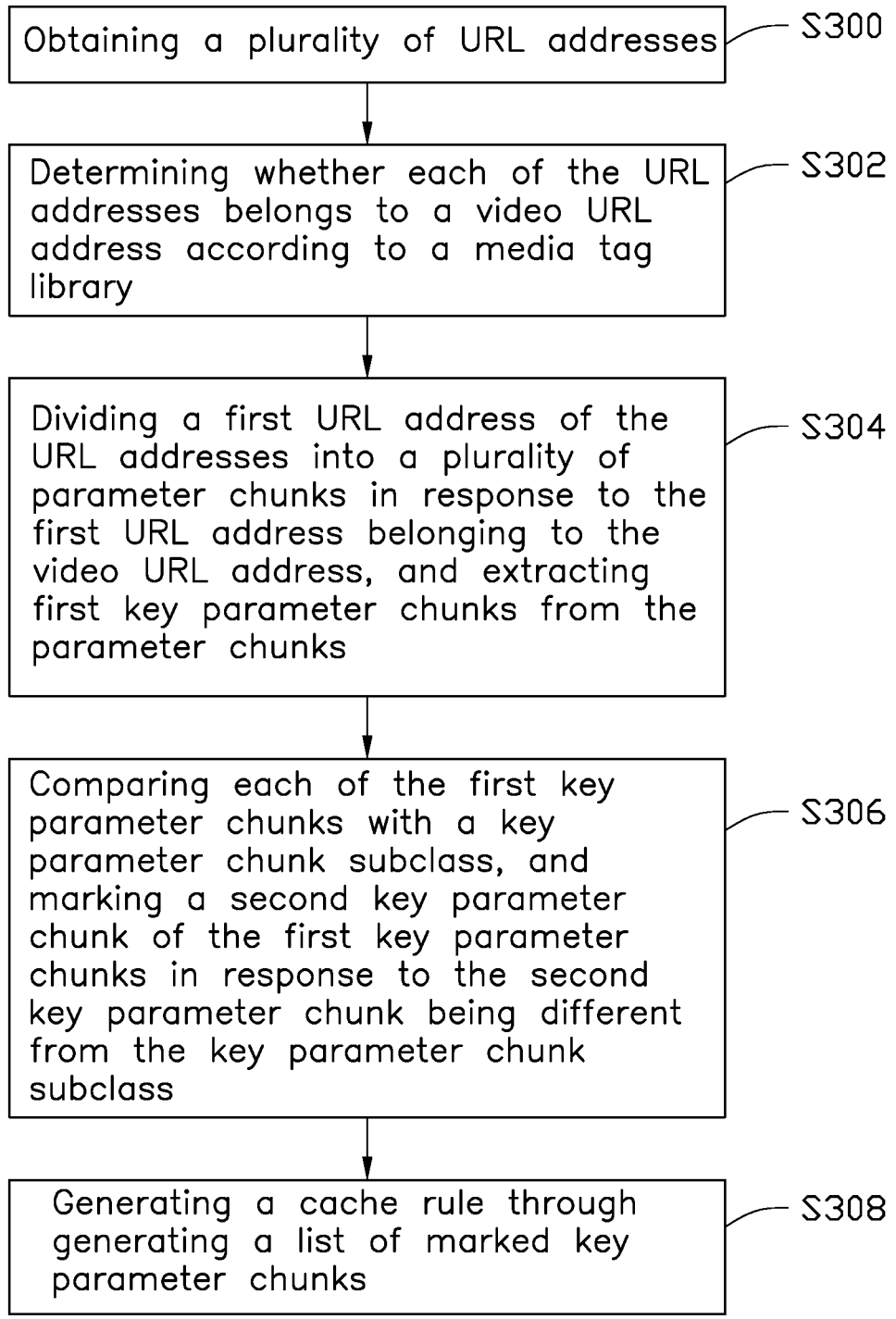
FIG. 3 is a flow diagram of an exemplary embodiment of a video cache rule generation method.

FIG. 3 illustrates an exemplary embodiment of a video cache rule generation method. The flowchart presents an exemplary embodiment of the method. The example method is provided by way of example, as there are a variety of ways to carry out the method. The method described below can be carried out using the configurations illustrated in FIG. 2, for example, and various elements of these figures are referenced in explaining the example method. Each step shown in FIG. 3 represents one or more processes, methods, or subroutines, carried out in the example method. Furthermore, the illustrated order of steps is illustrative only and the order of the steps can change. Additional steps can be added or fewer steps may be utilized, without departing from this disclosure. The example method can begin at step S300.

In step S300, the obtaining module 1 obtains a plurality of URL addresses.

In step S302, the determining module 2 determines whether each of the URL addresses belongs to a video URL address according to a media tag library.

In step S304, the extracting module 3 divides an URL address into a plurality of parameter chunks in response to the URL address belonging to the video URL address, and extracts first key parameter chunks from the parameter chunks.

In step S306, the comparing module 4 compares each of the first key parameter chunks with a key parameter chunk subclass, and marks a second key parameter chunk of the first key parameter chunks in response to the second key parameter chunk being different from the key parameter chunk subclass.

In step S308, the generating module 5 generates a cache rule through generating a list of marked key parameter chunks to summarize regularities.

In one exemplary embodiment, the media tag library comprises a plurality of media tag keywords. The media tag keywords can be suffixes or file types of videos. For example, the media tag keywords can be fly, mp4, avi, rm, rmvb, wmv, ism, audio, video, 3gp, or mpg.

For example, when the first URL address belongs to the video URL address, the extracting module 3 divides the first URL address into a protocol parameter chunk, a host parameter chunk, a port parameter chunk, a path parameter chunk, a characteristic parameter chunk, a search parameter chunk, and a fragment parameter chunk. The predetermined key parameter chunk attributes comprise a host attribute, a port attribute, a path attribute, and a characteristic attribute. Then, the extracting module 3 extracts the host parameter chunk, the port parameter chunk, the path parameter chunk, and the characteristic parameter chunk as the first key parameter chunks.

In one exemplary embodiment, each of the first key parameter chunks is mapped to a different key parameter chunk subclass. For example, the host parameter chunk of the first URL address is mapped to a first key parameter chunk subclass. The first key parameter chunk subclass comprises a plurality of host parameter chunks extracted from other video URL addresses.

The comparing module 4 compares the host parameter chunk of the first URL address with host parameter chunks of the other video URL addresses. When the host parameter chunk of the first URL address is different from the host parameter chunks of the other video URL addresses, the comparing module 4 marks the host parameter chunk of the first URL address. The comparing module 4 compares the path parameter chunk of the first URL address with path parameter chunks of the other video URL addresses. When the path parameter chunk of the first URL address is different from the path parameter chunks of the other video URL addresses, the comparing module 4 marks the path parameter chunk of the first URL address.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A video cache rule generation method comprising:
   obtaining a plurality of uniform resource locator (URL) addresses;
   determining whether each of the URL addresses belongs to a video URL address according to a media tag library;
   dividing a first URL address of the URL addresses into a plurality of parameter chunks in response to the first URL address belonging to the video URL address, and extracting first key parameter chunks from the parameter chunks;
   comparing each of the first key parameter chunks with a key parameter chunk subclass, and marking the first key parameter chunks different from the key parameter chunk subclass as second key parameter chunks; and
   generating a cache rule through generating a list of the second key parameter chunks;
   wherein each of the first key parameter chunks is mapped to a different key parameter chunk subclass.

2. The video cache rule generation method of claim 1, wherein the media tag library comprises a plurality of media tag keywords, and the step of determining whether each of the URL addresses belongs to a video URL address according to a media tag library comprises:
   determining whether each of the URL addresses comprises at least one media tag keywords; and
   determining each of the URL addresses as belonging to a video URL address in response to each of the URL addresses comprising the at least one media tag keywords.

3. The video cache rule generation method of claim 1, wherein the step of dividing a first URL address of the URL addresses into a plurality of parameter chunks in response to the first URL address belonging to the video URL address, and extracting first key parameter chunks from the parameter chunks comprises:
   dividing a first URL address of the URL addresses into a plurality of parameter chunks in response to the first URL address belonging to the video URL address;
   applying a unique attribute to each of the parameter chunks; and
   extracting first key parameter chunks from the parameter chunks of the first URL address according to predetermined key parameter chunk attributes.

4. A video cache rule generation method comprising:
   obtaining a plurality of uniform resource locator (URL) addresses;
   determining whether each of the URL addresses belongs to a video URL address according to a media tag library;
   dividing a first URL address of the URL addresses into a plurality of parameter chunks in response to the first URL address belonging to the video URL address, and extracting first key parameter chunks from the parameter chunks;
   comparing each of the first key parameter chunks with a key parameter chunk subclass, and marking first key parameter chunks different from the key parameter chunk subclass as second key parameter chunks; and generating a cache rule through generating a list of the second key parameter chunks;

wherein each of the first key parameter chunks is mapped to a different key parameter chunk subclass;

wherein the first key parameter chunks comprise a host parameter chunk and a path parameter chunk; and the step of comparing each of the first key parameter chunks with a key parameter chunk subclass, and marking the first key parameter chunks different from the key parameter chunk subclass as the second key parameter chunks comprises:

determining whether each of the URL addresses has the same host parameter chunk and the same path parameter chunk; and comparing each of the first key parameter chunks with the key parameter chunk subclass in response to each of the URL addresses having the same host parameter chunk and the same path parameter chunk, and marking the first key parameter chunk different from the key parameter chunk subclass as the second key parameter chunks, wherein each of the URL addresses belongs to the video URL address;

comparing each of the first key parameter chunks with the key parameter chunk subclass in response to each of the URL addresses having the same host parameter chunks and different path parameter chunks;

calculating a number of types of the second key parameter chunks, and determining whether the number of types being greater than a threshold value;

marking the first key parameter chunk different from the key parameter chunk subclass and the number of types being less than the threshold value, wherein a number of the URL addresses is greater than the threshold value.

5. The video cache rule generation method of claim 4, wherein the key parameter chunk subclass comprises a plurality of second key parameter chunks divided from the URL addresses.

6. The video cache rule generation method of claim 4, wherein the first key parameter chunks comprise a host parameter chunk; and the step of generating a cache rule through learning marked key parameter chunks comprises:

determining whether marked key parameter chunks correspond to different host parameter chunks; and combining the marked key parameter chunks in response to the marked key parameter chunks corresponding to different host parameter chunks; and generating a cache rule through generating a list of combined key parameter chunks.

7. A video cache rule generation system comprising:

at least one storage unit configured to store a plurality of modules, being a collection of instructions of an application operable in the system;

at least one processor configured to execute the plurality of modules, the modules comprising:

an obtaining module configured to obtain a plurality of URL addresses;

a determining module configured to determine whether each of the URL addresses belongs to a video URL address according to a media tag library;

an extracting module configured to divide a first URL address of the URL addresses into a plurality of parameter chunks in response to the first URL address belonging to the video URL address, and extract first key parameter chunks from the parameter chunks;

a comparing module configured to compare each of the first key parameter chunks with a key parameter chunk subclass, and mark the first key parameter chunks different from the key parameter chunk subclass as second key parameter chunks; and a generating module configured to generate a cache rule through generating a list of the second key parameter chunks;

wherein each of the first key parameter chunks is mapped to a different key parameter chunk subclass.

8. The video cache rule generation system of claim 7, wherein the media tag library comprises a plurality of media tag keywords; and the determining module is further configured to determine whether each of the URL addresses comprises at least one media tag keywords, and determine each of the URL addresses as belonging to the video URL address in response to each of the URL addresses comprising the at least one media tag keywords.

9. The video cache rule generation system of claim 7, wherein the extracting module is further configured to apply a unique attribute to each of the parameter chunks of the first URL address, and extract the first key parameter chunks from the parameter chunks according to predetermined key parameter chunk attributes.

10. A video cache rule generation system comprising:

at least one storage unit configured to store a plurality of modules, being a collection of instructions of an application operable in the system;

at least one processor configured to execute the plurality of modules, the modules comprising:

an obtaining module configured to obtain a plurality of URL addresses;

a determining module configured to determine whether each of the URL addresses belongs to a video URL address according to a media tag library;

an extracting module configured to divide a first URL address of the URL addresses into a plurality of parameter chunks in response to the first URL address belonging to the video URL address, and extract first key parameter chunks from the parameter chunks;

a comparing module configured to compare each of the first key parameter chunks with a key parameter chunk subclass, and mark the first key parameter chunks different from the key parameter chunk subclass as second key parameter chunks; and a generating module configured to generate a cache rule through generating a list of the second key parameter chunks;

wherein each of the first key parameter chunks is mapped to a different key parameter chunk subclass wherein the first key parameter chunks comprise a host parameter chunk and a path parameter chunk; the determining module is further configured to determine whether each of the URL addresses has the same host parameter chunk and the same path parameter chunk; the comparing module is further configured to compare each of the first key parameter chunks with the key parameter chunk subclass in response to each of the URL addresses having the same host parameter chunk and the same path parameter chunk, and mark the second key parameter chunk in response to the second key parameter chunk being different from the key parameter chunk subclass, and wherein each of the URL addresses belongs to the video URL address;

wherein when the URL addresses have the same host parameter chunks and different path parameter chunks, the comparing module is further configured to calculate a number of types of the second key parameter chunks; the determining module is further configured to determine whether the number of types is greater than a threshold value; the comparing module marks the first key parameter chunks different from the key parameter chunk subclass as the second key parameter chunks and the number of types being less than the threshold value, and wherein a number of the URL addresses is greater than the threshold value.

11. The video cache rule generation system of claim 10, wherein when the number of types is greater than the threshold value, the comparing module does not mark the second key parameter chunk.

12. The video cache rule generation system of claim 10, wherein the key parameter chunk subclass comprises a plurality of second key parameter chunks divided from the URL addresses.

13. The video cache rule generation system of claim 10, wherein the first key parameter chunks comprise a host parameter chunk; the determining module is further configured to determine whether the marked key parameter chunks correspond to different host parameter chunks; and the generating module is further configured to combine the marked key parameter chunks in response to the marked key parameter chunks corresponding to different host parameter chunks, and generate the cache rule through generating a list of combined key parameter chunks.

* * * * *